(No Model.) 5 Sheets—Sheet 1.
W. D. SMITH.
BICYCLE DRIVING MECHANISM.
No. 595,661. Patented Dec. 14, 1897.
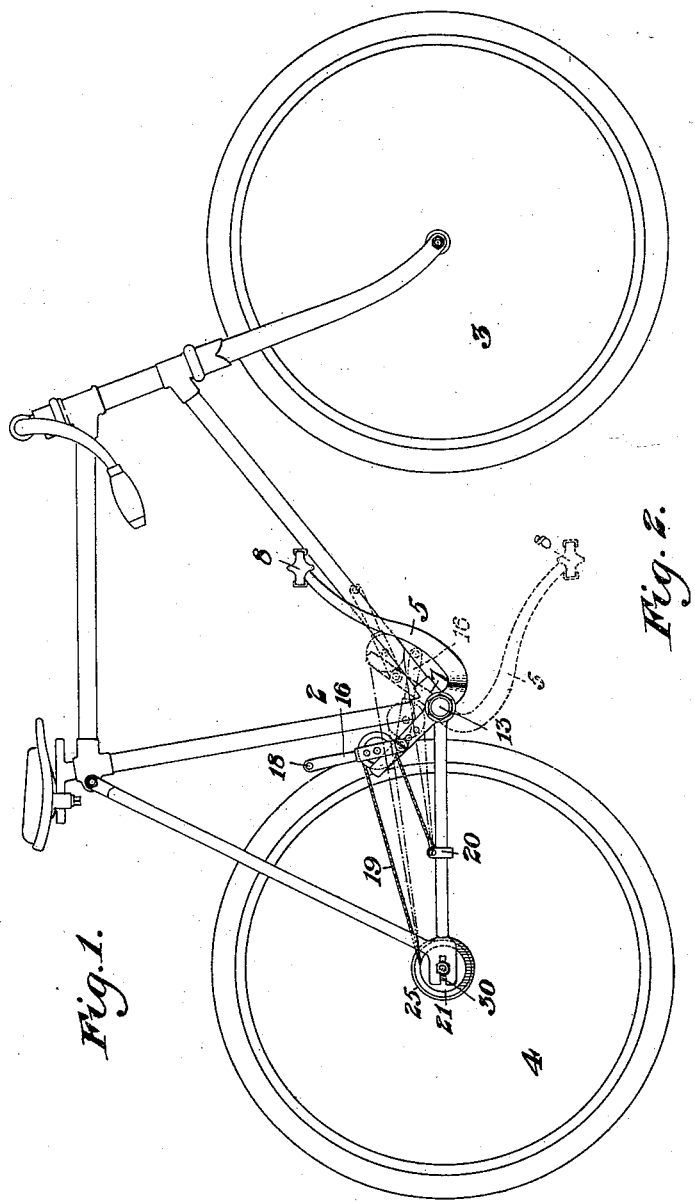
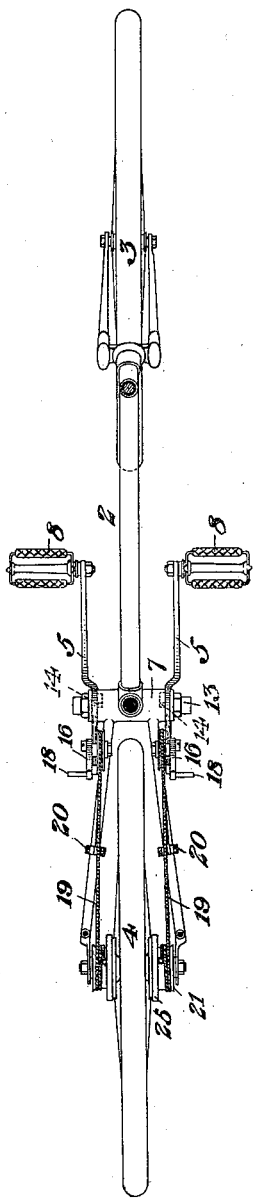
WITNESSES
Warren W. Swartz
H. M. Corwin
INVENTOR
W. D. Smith (No Model.) 5 Sheets—Sheet 2.
W. D. SMITH.
BICYCLE DRIVING MECHANISM.
No. 595,661. Patented Dec. 14, 1897.
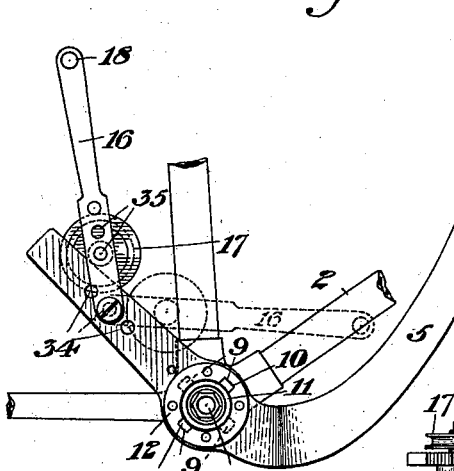
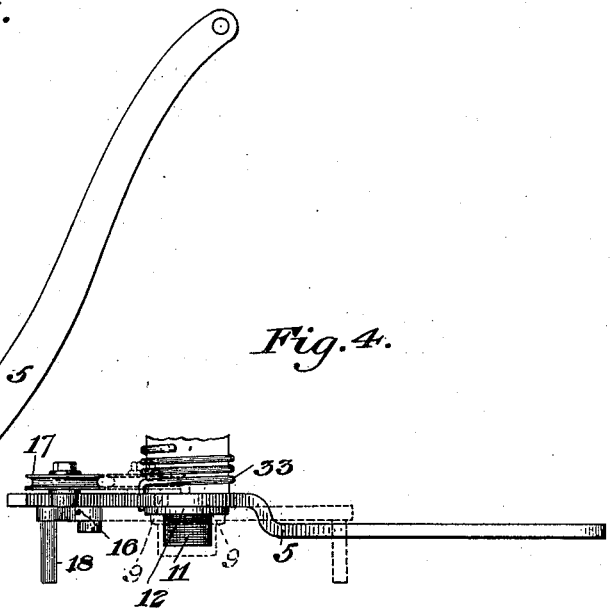
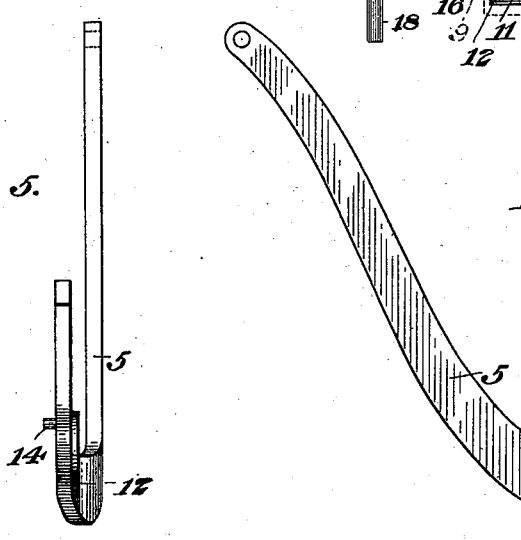
WITNESSES
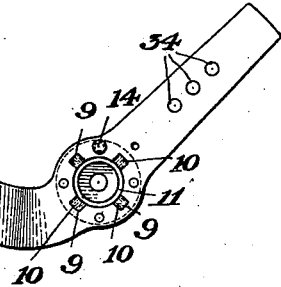
INVENTOR (No Model.) 5 Sheets—Sheet 3.
W. D. SMITH.
BICYCLE DRIVING MECHANISM.
No. 595,661. Patented Dec. 14, 1897.
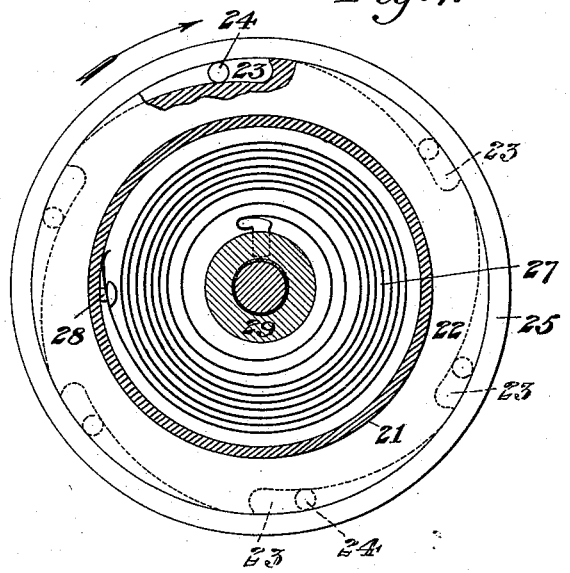
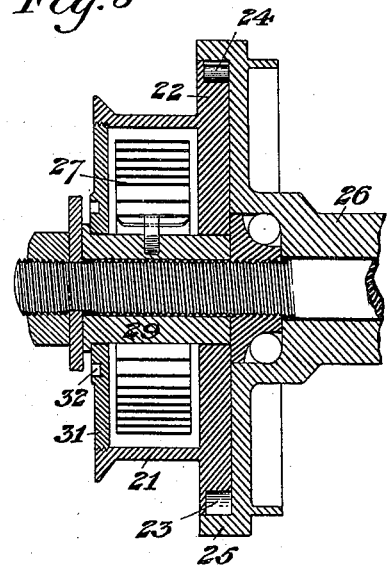
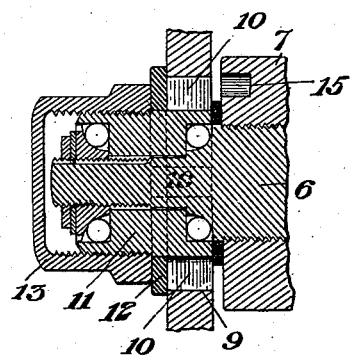
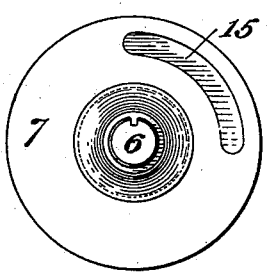
WITNESSES
INVENTOR
THE NORRIS PETERS CO., PHOTO-LITHO., WASHINGTON, D. C.

(No Model.) 5 Sheets—Sheet 4.
W. D. SMITH.
BICYCLE DRIVING MECHANISM.
No. 595,661. Patented Dec. 14, 1897.
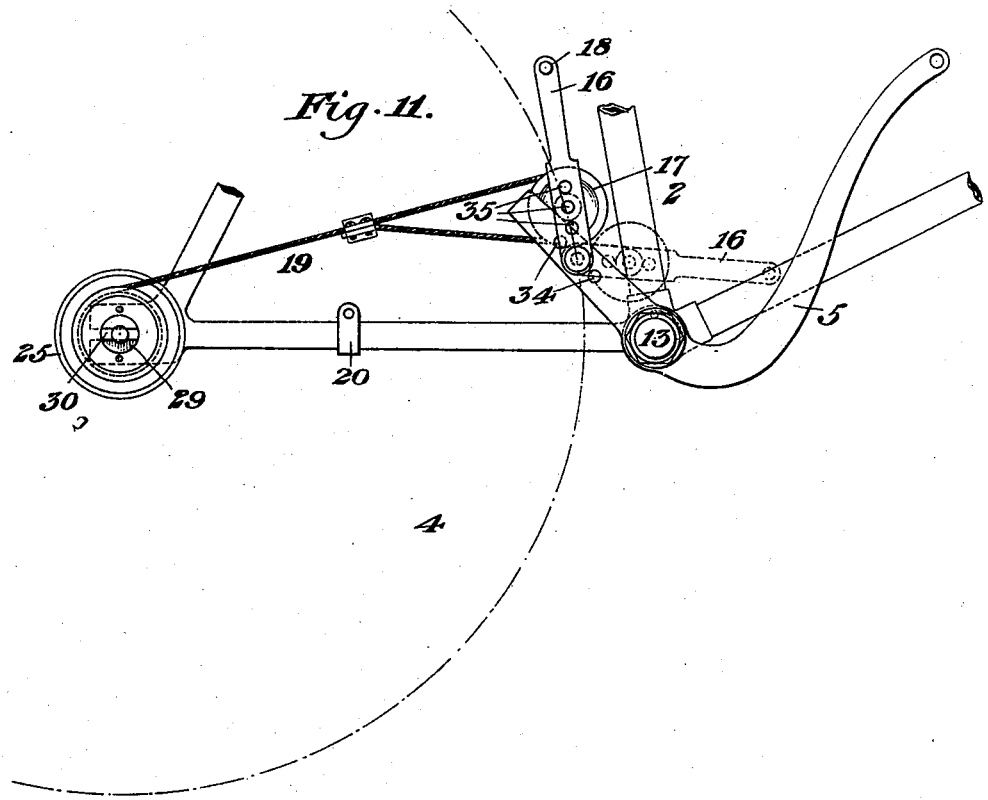

(No Model.)  5 Sheets—Sheet 5.

W. D. SMITH.
BICYCLE DRIVING MECHANISM.

No. 595,661.  Patented Dec. 14, 1897.

WITNESSES

INVENTOR

UNITED STATES PATENT OFFICE.

WILLIAM D. SMITH, OF DENVER, COLORADO.

BICYCLE DRIVING MECHANISM.

SPECIFICATION forming part of Letters Patent No. 595,661, dated December 14, 1897.

Application filed July 1, 1896. Serial No. 597,675. (No model.)

*To all whom it may concern:*

Be it known that I, WILLIAM D. SMITH, of Denver, in the county of Arapahoe and State of Colorado, have invented a new and useful Improvement in Bicycle Driving Mechanism, of which the following is a full, clear, and exact description, reference being had to the accompanying drawings, forming part of this specification, in which—

Figure 12:
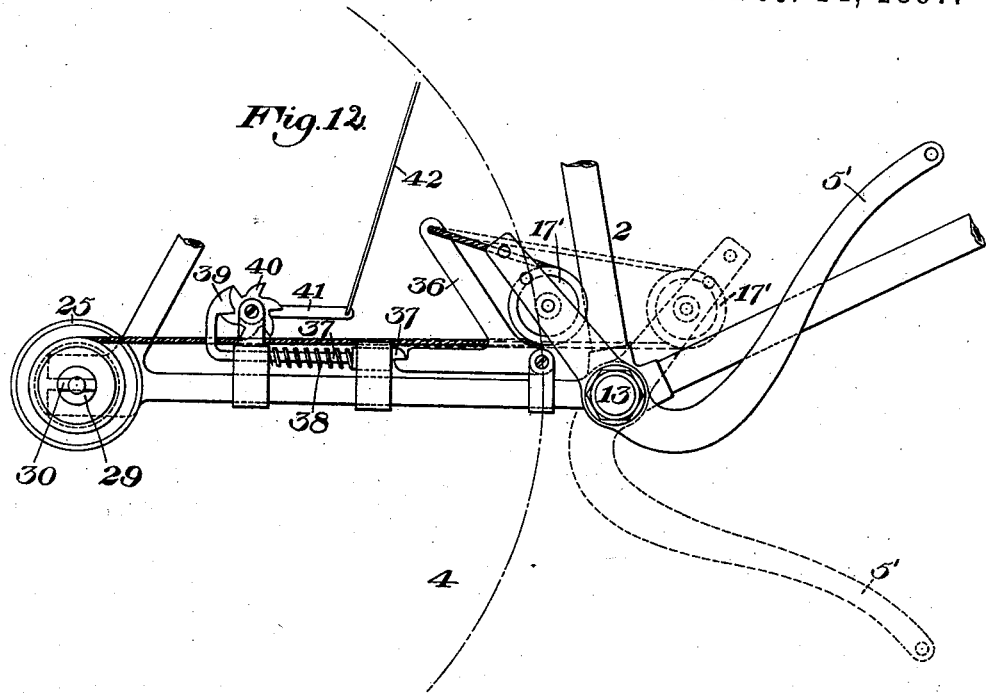
Figure 13:
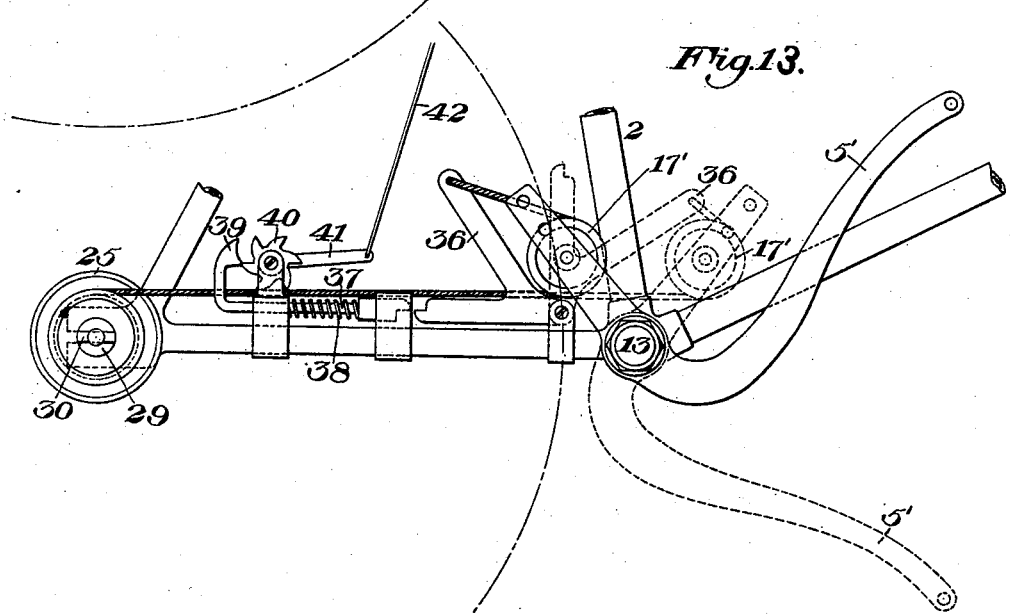

Figure 1 is a side elevation of a safety-bicycle provided with my improved driving mechanism. Fig. 2 is a plan view of the same, partly in section. Figs. 3, 4, 5, and 6 are detail views on a larger scale, showing the driving-lever and its connections. Figs. 7 and 8 are detail views, on a larger scale, of the clutch mechanism on the shaft of the rear wheel. Figs. 9 and 10 are enlarged detail views of the bearing for one of the driving-levers. Fig. 11 is a partial side elevation showing devices for attaching the pulley-cord, and Figs. 12 and 13 are similar views of driving connections between the driving-levers and driving-wheel.

My invention relates to that class of bicycles which are driven by means of two-armed levers, the pedals being secured to the forwardly-projecting arms of these levers, and the rearwardly-projecting arms being connected to clutches upon the driving-wheel. Heretofore in this class of machines to get the gear sufficiently high for practical purposes it has been necessary to make the rear arm of the lever so long that it is cumbersome and is very likely to contact with the rider and interfere with the operation. My invention overcomes this difficulty; and it consists in providing the rearwardly-projecting arm of the driving-lever with a roller over which the flexible connection passes to the clutch, thus multiplying the motion, so that the rear arm may be made shorter than the pedal-arm, while the gearing may be made comparatively high. It also consists in the construction and arrangement of the parts, as hereinafter more fully described, and set forth in the claims.

In the drawings, in which similar numerals indicate corresponding parts, 2 represents the frame of a safety-bicycle, having therein bearings for the front wheel 3 and for the rear wheel 4. The machine is operated by a pair of driving-levers 5 5, each of which has an axle piece or journal screwed into or otherwise rigidly attached to the axle-hanger 7, the driving-levers turning on bearings at opposite ends of the axle-hanger, so that they work independently of each other. (See Fig. 9.) Surrounding the journal of axle 6 is a thimble 11, at each end of which between the thimble and the axle is a set of ball-bearings $x\,x$, which are placed in recesses at each end of the thimble, and are thus separated from each other as far as the length of the thimble between the recesses will permit, so as to afford a longer bearing and prevent torsional strain on the axle. The thimble 11 is kept in place on the axle-journal by a nut and washer at the end of the axle in the usual way, and a dust-cap 13 is screwed onto the thimble against a washer 12, which surrounds and is fastened to the socket of the driving-lever 5, thus holding the parts in place. The flange of the dust-cap 13 also serves to cover an aperture for admission of oil. The washer 12 has also, preferably, two notches or recesses 10 on opposite sides, not necessarily extending through it, which register with two notches in the driving-lever to receive two correspondingly-projecting radial lugs on the thimble 11, these recesses and lugs being marked 10 in Fig. 9 and also by dotted lines in Fig. 3, the lugs 10 projecting sufficiently to engage the notches in the washer 12.

Each driving-lever is provided with a projecting pin 14 on its inner face, (see Figs. 2 and 6,) which enters an arc-shaped slot 15 in the face of the axle-hanger 7, (see Fig. 10,) thus limiting the angular movement of the driving-lever and furnishing a stop, so as to afford a rest for the feet of the driver when coasting without interfering with the rotation of the driving-wheel.

The short arm of the pedal-lever is so situated relatively to the pedal-arm that the pulling motion of the roller shall be in an arc of a circle above the horizontal line and in a forward direction, the consequence being that in the operation of the lever the motion of the lever will impart a substantially straight pull forward to the driving rope or strap, thus reducing the friction to a minimum.

To the rearwardly-extending arm of the driving-lever is pivoted a swinging link 16, having pivotally supported therein a roller 17, which has a grooved periphery, and the arm is provided at its upper end with an outwardly-projecting pin 18, to be engaged by the foot of the rider when it is desired to change the gear. Passing around the roller 17 is a strap, cable, or rope of metal 19 or other suitable material, which is preferably secured at one end to the frame at point 20 between the axle of the driving-wheel and the axles of the driving-levers, and at the other end is wrapped around the drum 21 of a friction-clutch surrounding the shaft of the rear wheel. (See Figs. 1 and 2.) This drum is provided at its inner portion with an outwardly-extending flange 22, having a series of inclined peripheral grooves 23, containing short cylindrical rollers 24. (See Figs. 7 and 8.) Inclosing the periphery of this flange is the rim portion 25 of the rear hub 26, this rim acting as a friction-clutch in conjunction with the rollers 24, moving in the inclined grooves. Inclosed within the drum 21 is a coiled spring 27, secured to the drum at point 28 and to a thimble 29, which surrounds the screw-threaded end of the shaft and is prevented from rotation by lugs 30 entering a slot in the rear end of the frame and shown more clearly in Fig. 11. The drum 21 is closed by a cover-plate 31, having recesses 32, by which it is screwed into the outer face of the drum. The hub 26 has a ball-bearing connection with the shaft, and it is evident that as the drum is rotated by the cable in the direction of the arrow in Fig. 7 the rear wheel will be rotated correspondingly by reason of the friction-clutch connection.

The operation of the device will be apparent to those skilled in the art. When either of the driving-levers is depressed either partially or to the limit of its motion by the foot of the rider pressing on the pedal at its forward end, the roller, acting upon the rope, draws the same forwardly and the friction-clutch coming into action rotates the rear wheel, thus driving the machine. It is evident that the pedals may be depressed either alternately or simultaneously and at such intervals as the rider desires and that the amount of angular motion at each stroke may be changed as wished. To lower the gear of the machine, the rider, placing his foot upon the pin 18, forces the link forwardly into the position shown in dotted lines in Figs. 1 and 3, thus bringing the roller much nearer the fulcrum-point of the driving-lever and reducing its range of motion accordingly. To afford additional means for adjusting the gear of the wheel, I provide a series of holes 34 in the rear arm of the driving-lever, the link 16 being pivoted in any of these holes desired, and for this same purpose I provide the link itself with a series of holes 35, within either of which the roller may be pivoted, thus giving a varied and accurate adjustment of the gear desired. Instead of securing one end of the driving cable or rope 19 to the frame, as shown in Fig. 1, I may secure the return portion to the cable itself, as shown in Fig. 11, thus making the gear of the machine one-half that shown in Fig. 1, giving four changes of the gear—two where the cord is secured to the frame and two where the return portion is secured to the cord.

In Figs. 12 and 13 I illustrate another means for changing the gear of the machine while the same is in motion, the roller 17' being pivoted directly to the rear arm of the driving-lever 5' and the front end of the driving-cord being secured to an angular lever or trigger 36, the lower horizontal arm of which is normally held in place by a sliding bolt 37, having a projection taking over a shoulder upon the end of the arm, this bolt being held in place by a spring 38. The rear end of the bolt is bent upwardly and terminates in a pawl 39, which engages the teeth of a ratchet-wheel 40, whose shaft is provided with a lever 41, which is actuated by a cord 42, passing up to a point within easy reach of the rider. The parts are normally in the position shown in Fig. 12, and when in this position the trigger 36 remains stationary, the rope or cable sliding over the roller as the driving-lever is drawn forward. When it is desired to reduce the gear, the rider, pulling upon the cord 42, rotates the ratchet-wheel 40, and, forcing back the bolt 39 against the action of the spring, releases the trigger 36, setting it free to follow the movement of the driving-lever, as shown in Fig. 13, thus reducing the gear one-half.

The advantages of my invention result from the fact that by placing a multiplying roller or pulley upon the rear arm of the driving-lever I am able to make this arm so short that it will not interfere with the rider, while the gearing may be brought to any desired degree. A simple and effective means for changing the gear is provided which is easily operated by the rider while the machine is in motion, and the rests for the levers give means for supporting the feet of the rider while coasting, the levers being then at rest.

Many variations in the form and arrangements of the parts may be made without departing from my invention, since

I claim—

1. A safety-bicycle having a rocking lever provided with two arms of unequal length, a pedal secured to the forward-projecting longer arm, a roller connected to the rear and shorter arm, and a flexible connection passing over the roller and secured to the driving-drum, the other end of said connection being attached at a stationary point.

2. A safety-bicycle having a rocking lever provided with two arms of unequal length, a pedal secured to the forwardly-projecting longer arm, a pivoted extension-piece secured to the rear and shorter arm, a roller mounted upon said extension and arranged to move in an arc above the horizontal, and a flexible connection attached at one end at a stationary point, said connection passing over the roller and being secured to the driving-drum.

3. In a safety-bicycle driving mechanism, a two-arm driving-lever, with a foot-pedal at the extremity of one arm, and on the other arm a swinging extension-piece carrying a pulley for the strap or flexible connection between the driving-lever and the clutch on the driving-wheel, both the short arm of the lever and the extension-piece having several pivot-holes so as to afford a larger scope for variation of the relative gear of the driving-wheel and driving-lever, to suit the exigencies of travel, substantially as described.

4. A safety-bicycle having a rocking lever provided with two arms of unequal length, a pedal secured to the forwardly-projecting longer arm, a roller connected to the rear and shorter arm, said roller being arranged to move above the horizontal line, and a flexible connection secured to the driving-drum and passing over the roller, said connection having at the other end an attachment to a stationary point arranged to give a multiplying motion, and means for changing said point of attachment arranged to give a direct connection and a non-multiplying motion.

5. In a safety-bicycle driving mechanism, the device for changing the gear, consisting of the combination of driving-lever, having rearwardly-extending short arm, and a pulley pivoted thereto, a friction-clutch on the axle of the driving-wheel, a flexible strap or cord attached to the clutch at one end, and at the other to a pivoted trigger engaging a spring-bolt, which when compressed gives to the cord a rigid point of attachment and when released allows it to follow the motions of the driving-lever; substantially as and for the purpose described.

6. A safety-bicycle having a rocking two-armed lever, on one arm of which is the pedal and on the other arm of which is a roller, and a flexible connection attached at one end to the frame, and passing around the roller to the driving-drum, said roller-carrying arm being constructed to move in an arc of a circle above the horizontal line and in a forward direction while pulling on the flexible connection.

In testimony whereof I have hereunto set my hand.

W. D. SMITH.

Witnesses:
  H. M. CORWIN,
  C. E. MACKOUN.